United States Patent

Vernaleken et al.

[15] 3,674,740
[45] July 4, 1972

[54] PROCESS OF PRODUCING POLYCARBONATE

[72] Inventors: Hugo Vernaleken, Krefeld; Otto Court, Neuss; Kurt Weirauch, Krefeld-Bockum, all of Germany

[73] Assignee: Farbenfabriken Bayer Aktiengesellschaft, Leverkusen, Germany

[22] Filed: April 8, 1970

[21] Appl. No.: 26,642

[30]         Foreign Application Priority Data

April 22, 1969  Germany......................P 19 20 302.2

[52] U.S. Cl..........................260/47 XA, 23/252, 23/270.5, 23/284, 259/4, 260/95 C, 260/413
[51] Int. Cl.........................................................C08g 17/13
[58] Field of Search....................23/284, 252, 270.5; 259/4; 260/47 XA

[56]            References Cited

UNITED STATES PATENTS 2,088,591  8/1937  Ferkel..................................259/4 UX
2,312,639  3/1943  Gronemeyer..............................259/4
2,913,318  11/1959  Erasmus et al............................23/284
3,119,704  1/1964  Harrell et al............................259/4 X
3,128,993  4/1964  Platte et al..................................259/4
3,530,094  9/1970  Schnell et al. ............................260/47
3,160,606  12/1964  Dietrich et al...........................260/47

FOREIGN PATENTS OR APPLICATIONS 138,592  6/1960  U.S.S.R. .....................................259/4
923,192  4/1963  Great Britain..........................260/47

*Primary Examiner*—Samuel H. Blech
*Attorney*—Burgess, Dinklage & Sprung

[57]            ABSTRACT

For carrying out phase boundary surface reactions of components, e.g., production of polycarbonates from phosgene, Bisphenol A, sodium hydroxide and water a reaction tube is used, which comprises a series of residence time sections of relatively large internal tube diameter and alternately positions with respect to mixing sections of smaller internal tube diameter, the mixing sections providing Reynolds numbers greater than 2,000 for the reactants.

4 Claims, 3 Drawing Figures

PATENTED JUL 4 1972

3,674,740

INVENTORS:
HUGO VERNALEKEN, OTTO COURT, KURT WEIRAUCH.
BY
Burgess, Dinklage & Sprung

PROCESS OF PRODUCING POLYCARBONATE

This invention relates to a reaction tube in which phase boundary surface reactions may be continuously carried out.

In phase boundary surface reactions, which are characterized by an exchange of substance between two or more phases which are immiscible with one another, the chemical conversion rate is determined by the reaction velocity and by the reaction time. Continuous operation of these reactions often leads to difficulties, since mixing of the reactants occurs in the reaction apparatus, so that separate fractions of the initial materials emerge prematurely and incompletely reacted, while other fractions remain in the apparatus for a correspondingly longer period and are subject to undesirable side reactions. The degree of mixing depends on the arrangement and the shape of the reaction vessels.

Very different examples of reaction vessels are the perfectly mixing stirrer-type vessel and the reaction tube. With a continuous throughflow, a narrow residence spectrum is obtained in a long reaction tube, while the said spectrum is broad in the perfectly mixing stirrer-type vessel. In order to carry out two-phase reactions in a reaction tube, high Reynolds numbers and thus high flow velocities are required in order to produce a thorough mixing of the phases. This is obtained in long tubes with a small diameter, but a large pressure loss has to be accepted. For many reactions which require relatively long residence times, the unfavorable ratio between length and diameter in reaction tubes is found to be uneconomical on account of the pressure loss. For reaction of this type the stirrer-type vessel is chosen. However when a narrow residence time distribution is required, it is necessary for a large number of such vessels to be arranged in series.

The present invention obviates the defects of the known arrangements by an alternating sequence of residence time sections having relatively large internal tube diameters and mixing sections of relatively small internal tube diameters, the latter sections guaranteeing Reynolds numbers greater than 2,000.

In this way, the disadvantages, such as high pressure loss in the reaction tube and a large number of series-connected stirrer-type vessels, are avoided.

In order to ensure a satisfactory reaction, the invention advantageously provides a combination of at least three residence time sections and three mixing sections.

According to one particular embodiment of the arrangement of the present invention, the ratios between the tube diameters of the residence time sections and the mixing sections vary between 3 and 50 and the ratio of their lengths may vary between 1 and 50.

The tube diameters of the mixing sections are chosen to be so large that flow velocities in these sections correspond to Reynolds numbers of advantageously greater than 2,000, but preferably greater than 2,300. During the passage of the reactants through the mixing tubes, a stable emulsion is formed. This emulsion then passes to the residence time tubes, the diameters of these tubes being such that the flow velocity in said tubes is such that no separation of the reactants into component parts occurs and good substance exchange takes place.

These arrangements are also suitable for carrying out reactions in the presence of solid catalyst substances in powder form, which substances tend to settle.

Examples of uses for this process are the production of polycarbonate by the phase boundary surface process, emulsion polymerization of vinyl monomers and fat saponification with aqueous alkali.

A reaction tube consists, for example, of 19 mixing tubes, with a nominal diameter of 4 mm and a length of 95 mm, and 19 residence time tubes with a nominal diameter of 20 mm and a length of 1,300 mm.

An initial material for reaction, consisting of 60 mols of phosgene in 120 liters of methylene chloride and 50 mols of Bisphenol A and 150 mols of sodium hydroxide solution, together with 1.4 mols of p-tert.-butyl phenol and 0.25 mols of triethylamine, in 80 kg of water, were conducted through this apparatus per hour.

A polycarbonate with a relative viscosity of 1.34, measured in methylene chloride at 25° C with a concentration of 0.5 g in 100 ml, was obtained. The polycarbonate had no saponifiable chlorine.

One embodiment of the reaction tube according to the invention is shown by way of example and is more fully explained by reference to the accompanying drawing, wherein.

Figure 1:
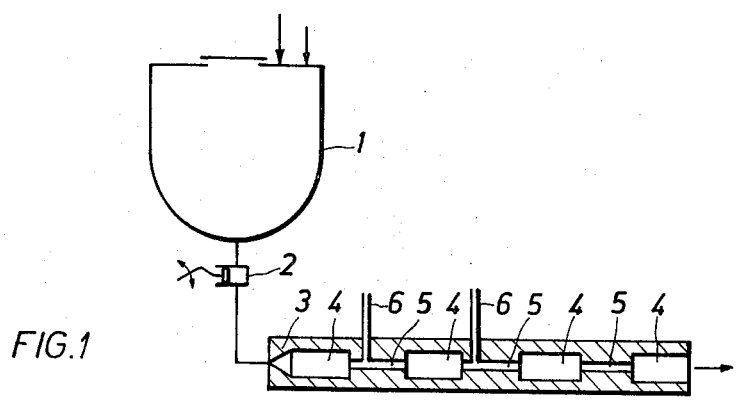
FIG. 1 is a diagrammatic view showing a construction for a reaction tube of the present invention.

In FIG. 1, a reaction mixture is pumped from a storage vessel 1 by way of a proportioning pump 2 to a reaction tube 3. The reaction tube 3 consists of residence time sections 4 and mixing sections, in which a Reynolds number greater than 2,300 is achieved. By means of openings 6, other reactants can be admixed or samples can be taken.

Figure 2:
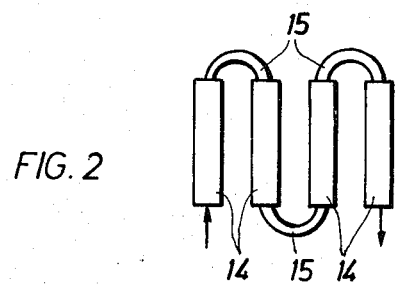
FIG. 2 is a similar view showing a sinuous construction of the reaction tube.

In FIG. 2, residence time sections 14 are arranged in juxtaposition, while mixing sections are constructed as connecting arcuate sections 15.

Figure 3:
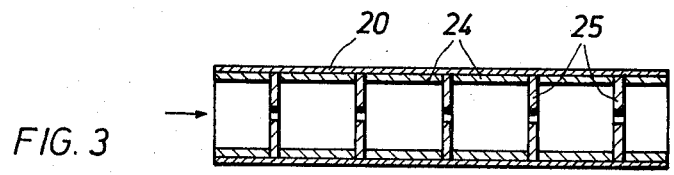
FIG. 3 is a cross sectional view showing one particular constructional form with fitting sleeves.

In FIG. 3, sleeves 24 and apertured discs 25 are fitted into a tube 20, the said sleeves representing the residence time sections and the discs representing the mixing sections.

We claim:

1. Process for continuously producing a polycarbonate by reaction of material in at least two phases and comprising phosgene, Bisphenol A, sodium hydroxide and water, which comprises passing the material though a series of residence time sections of relatively large cross-sectional area, and a series of mixing sections each composed of a tube of relatively small cross-sectional area, the residence time sections and and mixing sections alternating in position with the mixing sections communicating adjacent residence time sections for flow of said materials serially though said sections, the Reynolds number in the mixing sections being greater than 2,000, whereby said phases and intermixed in the mixing sections to form emulsions, and react in the residence time sections to form the polycarbonate.

2. Process according to claim 1, the emulsions passing through the residence time sections without separation.

3. Process according to claim 1, said Reynolds number being greater than 2,300.

4. Process according to claim 1, said material including methylene chloride, p-tert. butylphenol, and triethylamine.

* * * * *

UNITED STATES PATENT OFFICE
CERTIFICATE OF CORRECTION

Patent No. 3,674,740          Dated    July 4, 1972

Inventor(s)  Hugo Vernaleken et al.

It is certified that error appears in the above-identified patent and that said Letters Patent are hereby corrected as shown below:

Col. 2, line 47, cancel "and" (second occurrence).

Col. 2, line 52, after "said phases" change "and" to --are--.

Signed and sealed this 17th day of October 1972.

(SEAL)
Attest:

EDWARD M. FLETCHER, JR.                ROBERT GOTTSCHALK
Attesting Officer                      Commissioner of Patents